United States Patent Office 3,158,583
Patented Nov. 24, 1964

3,158,583
SULPHONATION OF CROSS-LINKED VINYL-
BENZENE POLYMERS
Herbert Corte, Leverkusen, Otto Netz, Cologne, and
Hans Seifert, Bergisch-Neukirchen, Germany, assignors
to Farbenfabriken Bayer Aktiengesellschaft, Lever-
kusen, Germany, a corporation of Germany
No Drawing. Filed Jan. 11, 1961, Ser. No. 81,950
Claims priority, application Germany Jan. 21, 1960
5 Claims. (Cl. 260—2.2)

The present invention relates to sulphonated cross-linked vinvylbenzene polymers containing more than one sulphonic acid group per aromatic nucleus and to a process of producing such sulphonated polymers.

Various processes are known for the production of cation exchangers by sulphonation of cross-linked polymers of aromatic vinyl compounds, such as styrene, vinyl toluene and chlorostyrene. In the U.S. patent specification 2,366,007, it is indicated that with the sulphonation of a cross-linked styrene polymer with chlorosulphonic acid for example a product is obtained which contains 1.77 sulphonic acid groups to each aromatic nucleus, this statement being merely based on the increase in weight of the initial resin.

Pepper (J. Applied Chem. 1 (1951) 124–132) has established that a maximum of one sulphonic acid group per aromatic nucleus can be introduced when sulphonating polymers of aromatic vinyl compounds with concentrated sulphuric acid. The same conclusion is also reached by Kressman (C. Calmon and T. R. E. Kressmann "Ion Exchangers in Organic and Biochemistry" New York, 1957, page 21) and also by Fr. Helfferich ("Ionenaustauscher," Weinheim 1959, vol. 1, page 32). Examination of the commercially available cation exchangers which are stated to be sulphonated cross-linked polystyrenes has shown, in agreement with the publications last referred to, that these cation exchangers also contain a maximum of one sulphonic acid group per aromatic nucleus.

Since the introduction of further sulphonic acid groups per aromatic nucleus could be of interest industrially in the sense of increasing the capacity of the exchanger, the example described in U.S. patent specification 2,366,007 of sulphonating polystyrene cross-linked with 10% divinyl benzene with chlorosulphonic acid has been explored in various embodiments within the scope of the general description. However, with samples which had been carefully freed from acid, completely hydrolysed and dried, it was not possible to confirm either by weight data or to show by sulphur analysis more than one sulphonic acid group, per aromatic nucleus.

It has now been found that by the action of oleum (i.e. sulphuric acid containing sulphur trioxide) on the monosulphonation products of cross-linked polymers of aromatic vinyl compounds, the introduction of a second sulphonic acid group per aromatic nucleus, becomes possible.

Examples of aromatic vinyl compounds which are suitable for the production of the cross-linked polymers are styrene, vinyl benzenes which are substituted in the aromatic nucleus by alkyl radicals such as vinyl ethyl benzenes, vinyl xylenes. These monomers are copolymerised according to methods known as such with polyolefinically unsaturated monomers, preferably divinylbenzene, divinyltoluene, trivinylbenzene, said polyolefinically unsaturated monomers being incorporated into said polymers by copolymerisation in amounts of 1–20 percent by weight. The polymers may be produced in the presence or absence of solvents and also using different types of polymerisation initiators, such as inorganic or organic peroxides, persulphate and other compounds. It is preferred to use bead polymers which are obtained by polymerising the monomers in aqueous suspension.

The monosulphonation of these aromatic vinyl polymers is effected by sulphonation of the polymers with concentrated (90–100%) sulphuric acid or chlorosulphonic acid. The sulphonation temperatures being about 0–150° C. in the case of the application of chlorosulphonic acid and about 80–150° C. in the case of application of concentrated sulphuric acid. It is possible to swell polymers in suitable swelling agents in known manner before sulphonation. Suitable swelling agents are halogenated aliphatic hydrocarbons, such as ethylenchloride, tetrachloroethylene, dichloropropane, trichloropropane. The sulphonating agents are preferably applied in amounts of 4–10 parts by weight per 1 part of polymer and the swelling agents in amounts of at least 10 percent as calculated on the weight of polymer. The polymers sulphonated according to the methods contain up to one sulphonic acid group, usually 0.7 to 1 sulphonic acid group per aromatic nucleus.

To introduce further sulphonic acid groups into the above sulphonation products these products are contacted at temperatures of about 50–120° C. with oleum containing between about 10 and 70% by weight of free $SO_3$, said oleum being preferably applied in amounts of 4 to 20 times the weight of the original (monosulphonated) polymer. For carrying through this second sulphonation step the above sulphonation product containing up to one sulphonic acid group per aromatic nucleus does not have to be isolated from the reaction mixture.

Oleum or sulphur trioxide may be added to this reaction mixture containing sulphuric acid in such a quantity that after the reaction is completed, the sulphonating acid still contains free sulphur trioxide. It is advantageous to work with such a sulphur trioxide concentration that the sulphonating acid still contains between 10 and 50% of free $SO_3$ after sulphonation has terminated. The reaction period, which depends on the nature of the resin used, the concentration of the oleum employed and the prevailing reaction temperature is generally between 1 and 50 hours. The course of the reaction is preferably determined in the usual manner by taking samples. After this threatment, dilution is generally carried out carefully with water or sulphuric acid of decreasing concentration and the reaction product is isolated in a manner known per se. Using the process according to the invention, cation exchange resins are obtained in which at least 1.2 but generally 1.5 to 2 sulphonic acid groups are present per aromatic nucleus. Consequently, the exchange resins containing sulphonic acid groups obtained according to the present process show a substantially increased capacity by comparison with prior known exchangers having sulphonic acid groups.

*Example 1*

500 g. of a polystyrene in bead form cross-linked with 8.5% divinyl benzene are allowed to swell in 200 ml. of ethylene chloride for 8 hours with stirring in a sulphonating flask equipped with a stirrer, thermometer and reflux condenser. 1300 ml. of concentrated sulphuric acid are then added and the mixture is heated for 3 hours to 120° C. with stirring. The ethylene chloride starts to distil at about 85° C. After heating for 4 hours at 120° C., the monosulphonation is completed. A sample of the reaction product, after dilution with water, has a total capacity of 2.3 mval./ml. in the H-form.

Completing of the monosulphonation, the product is allowed to cool to 80° C. and 1300 ml. of 65% oleum are gradually added dropwise at this temperature, the temperature rising to about 100° C. Heating is then continued for another 4 hours at 100° C., the temperature then being lowered and the reaction mixture very slowly diluted with water.

The cation exchanger obtained has a total capacity of 3.0 mval./ml. in the H-form.

*Example 2*

Under exactly the same conditions as in Example 1, a poly-p-vinyl toluene in bead form, cross-linked with 8.5% divinyl benzene, is first of all sulphonated with concentrated sulphuric acid. The product thus obtained has a total capacity of 2.2 mval./ml. in the H-form.

By further treatment with 65% oleum, a cation exchanger with a total capacity of 3.3 mval./ml. in the H-form is obtained.

If only a little $SO_3$ or oleum is used, so that the reaction mixture contains only a small amount of free $SO_3$ or none at all further sulphonation only takes place to a small degree or does not occur at all.

*Example 3*

If 1000 ml. instead of the 1300 ml. of 65% oleum referred to in Example 1 are used under conditions which are otherwise the same, the cation exchanger has a maximum capacity of 2.8 mval./ml. in the H-form. By using only 500 ml. of 65% oleum, a total capacity of only 2.45 mval./ml. in the H-form is obtained.

In addition, the degree of cross-linking has an influence on the extent of the disulphonation in the sense that cation exchangers with a lower degree of cross-linking produce a percentage greater increase in the total capacity upon subsequent sulphonation.

*Example 4*

If a bead polymer cross-linked with only 6% of divinyl benzene is sulphonated according to Example 1, the monosulphonation product has a total capacity of 1.9 mval./ml. in the H-form. The cation exchanger obtained after treatment with 65% oleum has a total capacity of 2.5 mval./ml. in the H-form.

*Example 5*

A polystyrene in bead form, cross-linked with 16% divinyl benzene, on being monosulphonated according to Example 1, gives a cation exchanger with a total capacity of 2.9 mval./ml. in the H-form. The cation exchanger obtained after treatment with oleum has a total capacity of 3.555 mval./ml. in the H-form.

*Example 6*

A poly-p-vinyl toluene in bead form, cross-linked with 6% divinyl benzene, on being treated with concentrated sulphuric acid according to Example 1, provides a cation exchanger with a total capacity of 1.8 mval./ml. in the H-form. Further treatment with 65% oleum yields a product with a total capacity of 2.8 mval./ml. in the H-form.

The cation exchanger monosulphonated in the usual manner can also be initially isolated as such and then preferably subjected after drying to treatment with oleum.

*Example 7*

A normal commercial cation exchanger in bead form which is obtained by sulphonation with chlorosulphonic acid of polystyrene cross-linked with 10% divinyl benzene and subsequent hydrolysis of the sulpho chloride and which was present in the Na-form, was converted by treatment with 10% hydrochloric acid into the H-form, and this was dried at 100° C. in vacuo. The dried product was introduced into 4 litres of 30% oleum and heated to 100° C. for 4 hours while stirring. After cooling, the reaction mixture was very slowly diluted with water and the cation exchanger washed free from acid.

The total capacity of the cation exchangers obtained in this way is 2.9 mval./ml. in the H-form, whereas the cation exchanger initially employed has a total capacity of 2.2 mval./ml. in the H-form.

The process also has a very advantageous effect when used on cation exchangers having a sponge structure, as described. These cation exchangers are produced from copolymers of monovinylbenzene hydrocarbons and polyvinylbenzenehydrocarbons, said copolymers being obtained by copolymerising said monomers, preferably in aqueous suspension, while dissolved in an inert organic solvent which causes said copolymers to form a sponge-like structure, such that the copolymer is capable of taking up solvents which have no swelling action thereon.

*Example 8*

500 g. of a bead polymer obtained by copolymerisation in aqueous suspension of a solution of divinyl benzene and styrene in 60% by weight related to the weight of the monomers of white spirit (boiling point 140–190° C.) the said polymer having a sponge structure and a divinyl benzene content of 8%, was swelled for 1 hour in 300 ml. of ethylene chloride and then heated for 3 hours to 120° C. with 1500 ml. of concentrated sulphuric acid in a sulphonation flask equipped with a stirrer, thermometer and reflux condenser. The distillation of the ethylene chloride starts at about 83° C. The product obtained after heating for 4 hours to 120° C. has a total capacity of 1.6 mval./ml. in the H-form.

After heating to 120° C., the product was cooled to about 80° C., and then 1500 ml. of 65% oleum were gradually introduced dropwise, the temperature rising to about 100° C. After heating for another 4 hours at 100° C., the reaction mass was cooled and then carefully diluted with water. The cation exchanger obtained which has a sponge structure, has a total capacity of 2.25 mval./ml. in the H-form.

*Example 9*

Sulphonation with concentrated sulphuric acid (as described in Example 8) of a bead polymer cross-linked with 8% divinyl benzene and obtained in a manner similar to that described in Example 8 but with addition of 100% by weight of white spirit (related to the weight of the monomer) produces a cation exchanger with a total capacity of 1.4 mval./ml. in the H-form. After treatment with 65% oleum, as described in Example 8, a cation exchanger with a total capacity of 2.0 mval./ml. in the H-form is obtained.

What we claim is:

1. Process for sulphonating cross-linked polymers of monovinylbenzene hydrocarbons which comprises contacting said cross-linked polymers with a sulphonating agent selected from the group consisting of chlorosulphonic acid and concentrated sulphuric acid at a temperature range of about 0–150° C. for chlorosulphonic acid and of about 80–150° C. for concentrated sulphuric acid to obtain sulphonated products containing about 0.7 to 1 sulphonic acid group per benzene nucleus, contacting said sulphonated products at a temperature range of about 50–120° C. with oleum containing from about 10 to 70% by weight of free $SO_3$, to obtain a final sulphonated product containing 1.5 to 2 sulphonic acid groups per aromatic nucleus.

2. Process according to claim 1 comprising treating said sulphonated products with a sulphonating agent consisting of $SO_3$ and oleum without first isolating said intermediate products.

3. Process according to claim 1, wherein said cross-linked polymer is a copolymer of a monovinylbenzene hydrocarbon and a polyvinylbenzene hydrocarbon, said polyvinylbenzene hydrocarbon being incorporated into said copolymer by polymerisation in amounts of about 1–20% by weight.

4. A cation resin comprising a cross-linked vinylbenzene copolymer containing 1.5 to 2.0 sulphonic acid groups on the aromatic nuclei, said sulphonic acid groups being introduced by two-step sulphonation according to claim 1.

5. Process for producing sulphonated cross-linked polymers of monovinylbenzene hydrocarbons which comprises contacting a sulphonated cross-linked polymer of monovinylbenzene hydrocarbon containing 0.7 to 1 sulphonic acid group per benzene nucleus at temperatures of about 50–120° C. with oleum containing between about 10 and 70% by weight of free $SO_3$ to produce sulphonated products which contain 1.5 to 2 sulphonic acid groups per benzene nucleus.

References Cited in the file of this patent

UNITED STATES PATENTS

| | | |
|---|---|---|
| 2,591,574 | McBurney | Apr. 1, 1952 |
| 2,763,634 | Teot | Sept. 18, 1956 |
| 2,809,960 | Roth | Oct. 15, 1957 |
| 2,891,014 | Tsunoda et al. | June 16, 1959 |

FOREIGN PATENTS

| | | |
|---|---|---|
| 1,075,318 | Germany | Feb. 11, 1960 |